(12) United States Patent
Badding et al.

(10) Patent No.: US 10,854,918 B2
(45) Date of Patent: Dec. 1, 2020

(54) MICROMACHINED ELECTROLYTE SHEET

(71) Applicant: CORNING INCORPORATED, Corning, NY (US)

(72) Inventors: Michael Edward Badding, Campbell, NY (US); Indrajit Dutta, Horseheads, NY (US); Lanrik Wayne Kester, Savona, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/363,509

(22) Filed: Mar. 25, 2019

(65) Prior Publication Data
US 2019/0221885 A1    Jul. 18, 2019

Related U.S. Application Data

(62) Division of application No. 13/249,935, filed on Sep. 30, 2011, now Pat. No. 10,283,811.

(51) Int. Cl.
*H01M 10/0562* (2010.01)
*H01M 2/14* (2006.01)

(52) U.S. Cl.
CPC ....... *H01M 10/0562* (2013.01); *H01M 2/145* (2013.01); *H01M 2300/0068* (2013.01)

(58) Field of Classification Search
CPC .......................... H01M 2/145; H01M 10/0562
See application file for complete search history.

(56) References Cited

U.S. PATENT DOCUMENTS

| 7,479,350 | B1* | 1/2009 | Neumann | ............... H01M 4/13 29/623.1 |
|---|---|---|---|---|
| 10,103,405 | B2 | 10/2018 | Choi et al. | |
| 2003/0180610 | A1 | 9/2003 | Felde et al. | |
| 2007/0175020 | A1 | 8/2007 | Nagata et al. | |
| 2008/0160324 | A1 | 7/2008 | Ohmori et al. | |
| 2008/0263855 | A1 | 10/2008 | Li et al. | |
| 2009/0081512 | A1 | 3/2009 | Blanchard et al. | |
| 2009/0123847 | A1* | 5/2009 | Okada | ................. H01M 4/5825 429/319 |

(Continued)

FOREIGN PATENT DOCUMENTS

| CN | 101786873 A | 7/2010 |
|---|---|---|
| DE | 10303063 A1 | 8/2004 |

(Continued)

OTHER PUBLICATIONS

Dingxiang Tang et al., Rare Earth Metal Materials, Beijing Metallurgical Industry Press, ISBN: 978-7-5024-5523-1, published on Aug. 2011, 6 Pgs.

(Continued)

*Primary Examiner* — Stephan J Essex
(74) *Attorney, Agent, or Firm* — Gregory V. Bean; Russell S. Magaziner

(57) ABSTRACT

The disclosure relates to ceramic lithium ion electrolyte membranes and processes for forming them. The ceramic lithium electrolyte membrane may comprise at least one ablative edge. Exemplary processes for forming the ceramic lithium ion electrolyte membranes comprise fabricating a lithium ion electrolyte sheet and cutting at least one edge of the fabricated electrolyte sheet with an ablative laser.

21 Claims, 6 Drawing Sheets

(56) References Cited

U.S. PATENT DOCUMENTS

2009/0305135 A1    12/2009    Shi et al.
2012/0295168 A1    11/2012    Holzapfel et al.

FOREIGN PATENT DOCUMENTS

| JP | 2001015153 A | 1/2001 |
|----|--------------|--------|
| JP | 2001176501 A | 6/2001 |
| JP | 2009193888 A | 8/2009 |
| WO | 2011045050 A1 | 4/2011 |
| WO | 2013035519 A1 | 3/2013 |

OTHER PUBLICATIONS

Honghe Zheng et al., Lithium ions battery electrolyte, Beijing Chemical Industry Press, ISBN: 7-5025-9448-5, published on Jan. 2007. 6 Pgs.
Xiangwan Du, "Thermal Effect of Laser on Solid Materials", High-tech Overview: Lasers, China Science and Technology Press, ISBN: 7-5046-2658-9, published on Oct. 2003, 6 Pgs.
The State Intellectual Property Office of the People's Republic of China; Notice on the Second Office Action of CN Application No. 201280047607.4; Filed Sep. 28, 2012; pp. 1-8.
Japanese Patent Office; Notice of Grounds for Rejection of JP Application No. 2014-533342; Date of Dispatch: Jul. 26, 2016; pp. 1-5.
CN201280047607.4 Notice on Reexamination dated Oct. 19, 2018, China Patent Office, 8 Pgs.

* cited by examiner

MICROMACHINED ELECTROLYTE SHEET

CROSS-REFERENCE TO RELATED APPLICATIONS

This application is a divisional of patent application Serial No. 13/249,935 filed on Sep. 30, 2011, and claims the benefit of priority to U.S. patent application Ser. No. 13/249,935 filed on Sep. 30, 2011, the content of which is relied upon and incorporated herein by reference in its entirety.

FIELD OF THE DISCLOSURE

The disclosure relates to lithium ion electrolyte membranes and processes for forming the same. In various embodiments, the lithium ion electrolyte membrane may comprise at least one ablative edge. In further embodiments, the processes for forming a lithium ion electrolyte membrane comprises fabricating a lithium ion electrolyte sheet and cutting at least one edge of the fabricated electrolyte sheet with an ablative laser to form an ablative edge.

BACKGROUND

Electrolyte membranes are known in the art, such as, for example, for use in battery structures and fuel cells. For example, U.S. Patent Application Publication No. 2009/0081512 describes zirconia-based ceramic electrolyte membranes and related methods of making by laser micromachining techniques. Other electrolyte membrane materials are based on lithium metal phosphates ("LMP") such as Lithium Titanium Phosphate ("LTP"), and may comprise LTP wherein a fraction of the titanium is replaced by Aluminum ("LATP"). It is well known that LMP electrolyte membranes are distinct from, and have different properties than, zirconia-based electrolyte membranes.

Thin LMP membranes may be desired in certain applications, for example to improve the membrane conductance, which is directly proportional to the membrane thickness. Conventional LMP-based membranes typically have conductivity of about $5 \times 10^{-4}$ S/cm, and a conductance of approximately 0.02 S. Membranes with conductance of about 0.05 S, or more preferably about 0.1 S or higher, are desirable in certain applications. Furthermore, it is known that these targets can be achieved by reducing the membrane thickness, for example to about 100 μm (0.05 S) or about 50 μm (0.1 S).

However, although thinner LMP membranes may be more desirable, for example in battery structure applications where a thinner membrane provides lower impedance and thus, lower internal resistance and higher power capability, it is generally difficult to make thin membranes having sufficiently precise dimensions with known methods, for example due to limits of mechanical cutting technology. Additionally, thin LMP membranes are typically fragile, and therefore difficult to fabricate and handle. For example, conventional mechanical cutting processes limit LMP membrane thickness to about 200 μm. This is particularly true when the membrane is unsupported, i.e., where the membrane is not integrated into a multi-layer structure wherein some other layer provides mechanical support.

In addition to the foregoing, polycrystalline electrolyte membranes typically have large grain boundary resistance compared to intra-grain resistance. Therefore, typical ceramic electrolyte membranes are often large-grained in order to minimize grain boundary effects. However, thin electrolyte membranes with large grains are typically weak and fine-grained ceramic membranes are mechanically superior to conventional ceramic membranes. Also, the mechanical properties of thin membranes can be severely degraded by edge defects and wrinkling that occurs during processing. For example, edge defects may be produced where the cutting process introduces microstructural features that may become points of stress concentration, thus reducing strength. Defects such as gross accumulation of melted material or voids resulting from substantial movement of melted material are undesirable in at least certain embodiments, as they may degrade mechanical properties if they are significant enough to influence stress distribution within the membrane. Further, it can be difficult, using conventional mechanical methods, to prepare an LMP electrolyte membrane having precise dimensions, due to shrinking during firing.

There is, therefore, a need to provide mechanically strong, thin, fine-grained ceramic lithium ion electrolyte membranes with high quality, defect-free edges.

SUMMARY

In accordance with the detailed description and various exemplary embodiments described herein, the disclosure relates to lithium ion electrolyte membranes and processes for forming the same. In various embodiments, the lithium ion electrolyte membranes may comprise at least one ablative edge. In various embodiments, the ablative edge may be lithium-enriched relative to the bulk of the membrane. In further embodiments, the membrane may be a ceramic lithium ion electrolyte membrane and may, in various examples, be supported or unsupported.

In at least certain embodiments, the lithium ion electrolyte membranes made according to the disclosure may be one or more of mechanically strong, dense, hermetic, flat, wrinkle-free, thin, pore-free, and fine-grained, and may comprise one or more substantially defect-free edges, particularly in comparison to pre-cut lithium ion electrolyte membranes. In addition, relative to previously known methods, it may be possible to fabricate lithium ion electrolyte membranes having substantially precise dimensions. However, it should be noted that at least certain embodiments according to the disclosure may not have one or more of the above-mentioned properties, yet such embodiments are intended to be within the scope of the disclosure.

BRIEF DESCRIPTION OF DRAWINGS

The accompanying drawings are included to provide a further understanding of the invention, and are incorporated in and constitute a part of this specification. The drawings are not intended to be restrictive of the invention as claimed, but rather are provided to illustrate exemplary embodiments of the invention and, together with the description, serve to explain the principles of the invention.

DETAILED DESCRIPTION

Figure 1A:
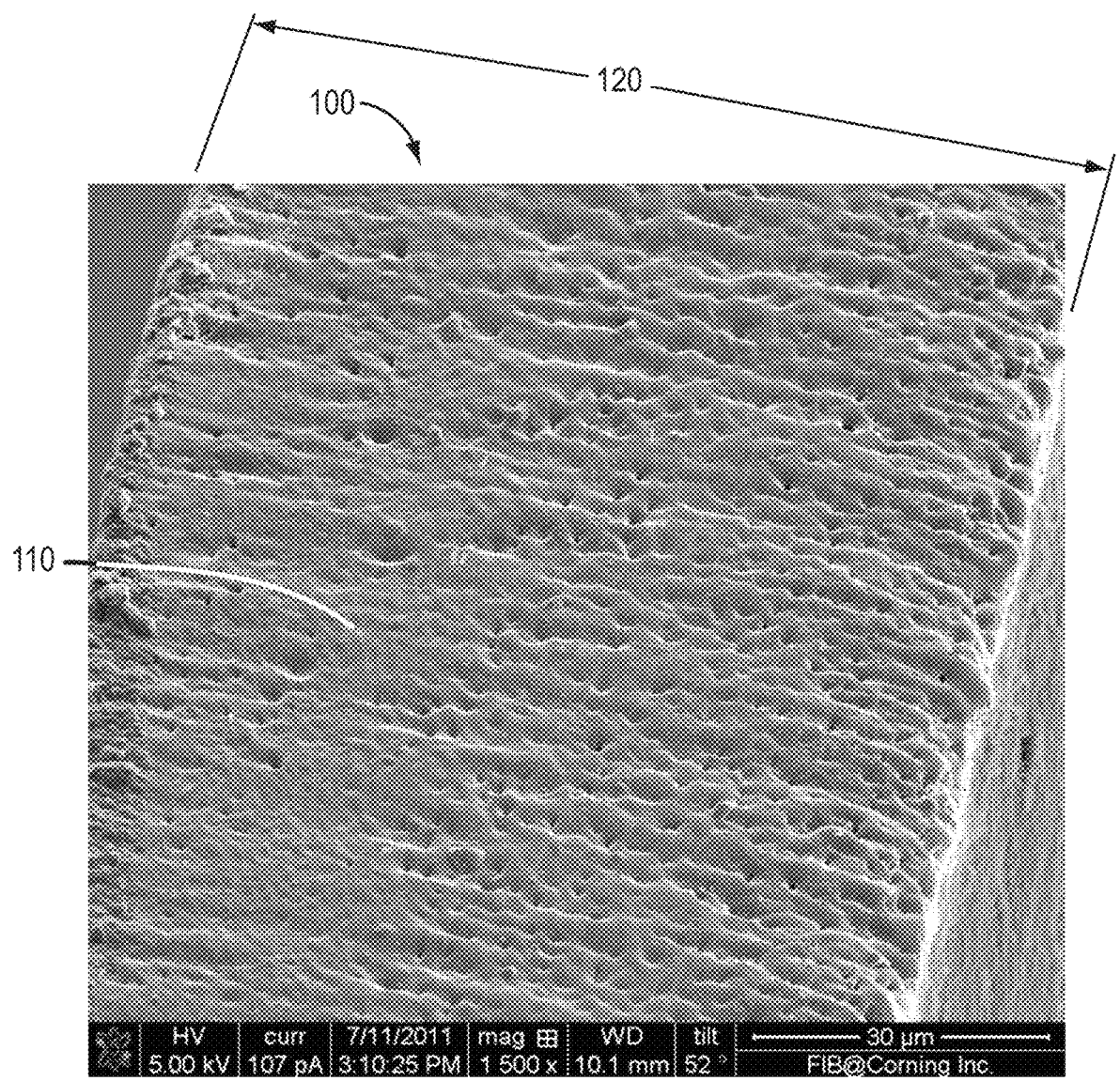
FIG. 1A is a 1500× SEM micrograph of an ablative edge of a lithium ion electrolyte membrane, formed according to an embodiment of the disclosure.

It is to be understood that both the foregoing general description and the following detailed description are exemplary and explanatory only and are not restrictive of the invention as claimed. Other embodiments will be apparent to those skilled in the art from consideration of the specification and practice of the embodiments disclosed herein. It is intended that the specification and examples be considered as exemplary only, with the true scope and spirit of the invention being indicated by the claims.

It is also to be understood that, while in various embodiments described herein, steps of exemplary processes disclosed are recited in a particular order, it is intended that the disclosed process steps may be carried out in any order that one of skill in the art would understand would not significantly change the desired product.

As used herein the articles "the," "a," or "an," mean "at least one," and should not be limited to "only one" unless explicitly indicated to the contrary. Thus, for example, the use of "the ablative edge" or "an ablative edge" is intended to mean at least one ablative edge.

The disclosure relates, in various embodiments, to methods of forming ceramic lithium ion electrolyte membranes, for example LMP electrolyte membranes, having at least one ablative edge. The at least one ablative edge may, in various embodiments, be substantially defect-free. The methods described herein may, in at least some embodiments, allow for preparation of a ceramic lithium ion electrolyte membrane having a thickness of about 400 μm or less, such as about 300 μm or less, for example about 200 μm or less. In further exemplary embodiments, the methods described herein may allow for an unsupported ceramic lithium ion electrolyte membrane to be formed.

In further embodiments, the methods described herein may be used to form lithium ion electrolyte membranes having a fine-grained structure. Large grains are considered to be defects in certain applications, and may degrade the mechanical properties of the membrane. In general it is desired that, in the vicinity of the cut edge, microstructural features formed from the cutting process be no more than about one-third times the thickness of the membrane. In further embodiments, the size of microstructural features introduced from the cutting process may be less than about ⅓ the thickness of the membrane, such as, for example, less than 1/10 the thickness of the membrane. For structures formed by the cutting process that exhibit a high aspect ratio, such as fibers or sheets, the diameter or thickness, respectively, may ideally, in at least some embodiments, be no more than about one-third times the thickness of the membrane.

Various exemplary methods of forming lithium ion electrolyte membranes described herein comprise steps of forming a sintered electrolyte membrane by tape casting methods, followed by laser micromachining the membrane to produce the desired electrolyte membrane.

Exemplary tape casting processes are known. Starting materials chosen to provide an LMP composition, such as, for example, an LTP or LATP composition may be mixed in an appropriate ratio. By way of example, starting materials for making LATP may be chosen from lithium carbonate, aluminum hydroxide, titanium oxide, ammonium dihydrogen phosphate, and phosphoric acid. In various embodiments, the LMP composition may be chosen from LATP compositions of the general formula $Li_{(1+x)}M^{III}{}_{(x)}M^{IV}{}_{(2-x)}(PO_4)_3$, where $M^{III}$ is a 3+ metal ion such as $Al^{3+}$, $La^{3+}$, $Ga^{3+}$, etc., and $M^{IV}$ is a 4+ metal ion such as $Ti^{4+}$, $Ge^{4+}$, $Sn^{4+}$, etc. For other 3+ metals, the aluminum hydroxide may be replaced by lanthanum hydroxide or gallium hydroxide, for example. For other 4+ metals, the titanium oxide may be replaced by germanium oxide or tin oxide, for example. In at least one embodiment, for example, the LMP composition may be chosen from $Li_{1.4}Al_{0.4}Ti_{1.6}(PO_4)_3$.

After mixing, the starting materials may be treated in such a way as to form a powder. Such treatments are known to those of skill in the art. For example, the starting materials may be calcined or otherwise reacted to form the desired phase. Alternatively, the starting materials may be reacted in solution, for example in a sol-gel synthesis.

By way of example only, in at least one embodiment, the starting materials may be calcined at temperatures ranging from about 400° C. to about 1000° C., such as about 600° C. to about 800° C. It may be desirable to calcine the starting materials in a vessel that does not react with or otherwise degrade the mixed starting materials during the process, such as, for example, a platinum crucible.

The mixed phase product may then be further processed in any way known to those of skill in the art (e.g. broken up, crushed to a coarse powder, and/or milled) so as to provide a powder that has a particle size of less than about 5 μm, such as less than about 2 μm, or less than about 1 μm. An LMP composition may, in at least one exemplary embodiment, have a particle size of less than about 0.5 μm, such as about 0.3 μm.

Once the desired particle size is achieved, a slip for a tape casting process may be prepared by combining the powder with components such as, for example, solvents (for example organic solvents and/or water), strengthening plasticizers, dispersants, binders, and/or any other component known in the art to be useful in preparing a slip for tape casting.

In at least one exemplary embodiment, phosphate additives may optionally be added to the composition, for example up to about 10 wt. %, such as up to about 7 wt. %, or up to about 5 wt. % of the inorganic solids content. In one exemplary embodiment, phosphate additives may optionally be added at an amount ranging from about 0.5 to about 5 wt. % of the inorganic solids content. In at least one embodiment, phosphoric acid is chosen. While not wishing to be bound by theory, it is believed that phosphate additives may promotes densification, while maintaining a fine grained structure.

The cast tape may then be dried by any method known, after which the tape can be released and cut. It may be desirable, in at least certain embodiments, to cut the tape oversized relative to the desired finished dimensions, to allow for shrinking during heat treatment, and further trimming after heating.

Once cut, the tape may be heat treated to form an electrolyte sheet. For example, the tape may be fired at a temperature in the range of about 700° C. to about 1200° C., such as about 800° C. to about 900° C. In one exemplary embodiment, the tape is sintered at a temperature of about 900° C. The temperature and duration of the heat treatment can be chosen by those of skill in the art such that, once complete, electrolyte sheets are produced having a relative density of greater than about 90%, such as greater than about 95% or greater than about 97%, and/or an average grain size of less than about 10 μm, such as less than about 5 μm, less than about 3 μm, or less than about 1 μm. For example, the tape may be heated for about 1 to about 5 hours, such as about 2 to about 3 hours, such as, for example, about 2 hours.

After the electrolyte sheet is formed, it may be micromachined by means of an ablative laser, in order to produce an electrolyte membrane having at least one ablative edge. Ablative lasers are known in the art, and any laser useful in the methods described herein may be used. It may be desirable, in at least certain embodiments, to avoid using lasers with high temperatures, which can cause local melting. Formation of molten material can result in very large grains in the vicinity of the cut, which may be desirable to avoid for at least certain applications.

It has been found that using an ablative laser may give the electrolyte membrane a physical appearance and characteristics similar to that of a sintered edge (i.e., melted) along the cut edge, without actually melting the material. This is of particular interest for at least certain applications, because such an edge is believed to impart improved physical properties, such as, for example, improved mechanical strength, density, and hermeticity, while providing an edge that is substantially flat, wrinkle-free, thin, pore-free, and fine-grained, relative to the uncut electrolyte sheet. The micromachined edge appears to have some amorphous characteristics, but there may be some remaining crystallinity.

The electrolyte sheet can be placed on an appropriate support and cut to the desired final dimensions with the ablative laser. As a non-limiting example, an LMP electrolyte membrane may be cut using a Nd:YVO$_4$ laser having a wavelength of less than about 2 μm, a fluence of less than about 250 Joules/cm$^2$, repetition rate between about 20 Hz and 100 MHz, and cutting speed of at least about 10 mm/sec. Further examples of ablative lasers that may be used include, but are not limited to, a picosecond laser operating at 355 nm laser wavelength, with a repetition rate of 1 MHz; a femtosecond laser operating at a wavelength of 1560 nm, 10 μJ pulse energy, 1 MHz repetition rate, and pulse duration of less than 700 fs; and a nanosecond 355 nm laser, operating at 100 kHz.

The ablative laser may, in various embodiments, be used to produce an LMP membrane that is less than about 400 μm thick, such as less than about 200 μm thick or less than about 100 μm thick. By way of example, the membrane may be about 25 μm to about 200 μm, such as about 40 μm to about 100 μm thick. The process may allow formation of a ceramic lithium ion electrolyte sheet having an ablative edge with a depth of less than about 5 μm, such as less than about 3 μm, for example less than about 2 μm.

It may be desirable, in certain embodiments, to employ one or more than one form of motion during the cutting process. For example, the laser, the support holding the electrolyte sheet, or both may be staged for the process. By way of non-limiting example, depending on the laser repetition rate chosen, multiple-pass laser cutting may involve moving the electrolyte sheet relative to the laser beam at a speed which is much higher than the effective cutting speed. The relative motion of the electrolyte material with respect to the laser beam may optionally be achieved with mechanical stages (mechanical scanning, involving motion by the support), by scanning the laser beam with an optical scanning device such as a galvanometer (optical scanning, which may use light-weight mirrors mounted on a motor), or some combination thereof. In at least certain exemplary embodiments, optical scanning may be preferred at high speed cutting operations because it enables uniform cutting at tight corner radius.

The number of passes made by the laser will vary depending on, for example, the thickness and material of the sheet and the parameters of the laser, and can easily be determined by those of skill in the art. For example, an LATP electrolyte sheet having a thickness of about 100 μm may require approximately 100 passes to ablate completely through the sheet.

Further embodiments according to the disclosure relate to ceramic lithium-ion electrolyte membrane comprising at least one ablative edge comprising a depth of less than about 5 μm, which may optionally be an outer edge. In the example of a two-dimensional membrane (membrane sheet), the depth of the ablative edge is measured normal to the thickness of the membrane. The at least one ablative edge, and the area of the membrane directly adjacent the ablative edge, may be enriched with lithium relative to the non-ablated (bulk) of the membrane. In various embodiments, the membrane may be comprised of grains having an average grain size of less than about 5 μm, have a relative density of greater than 90%, and comprise a thickness of up to about 200 μm.

Figure 1B:
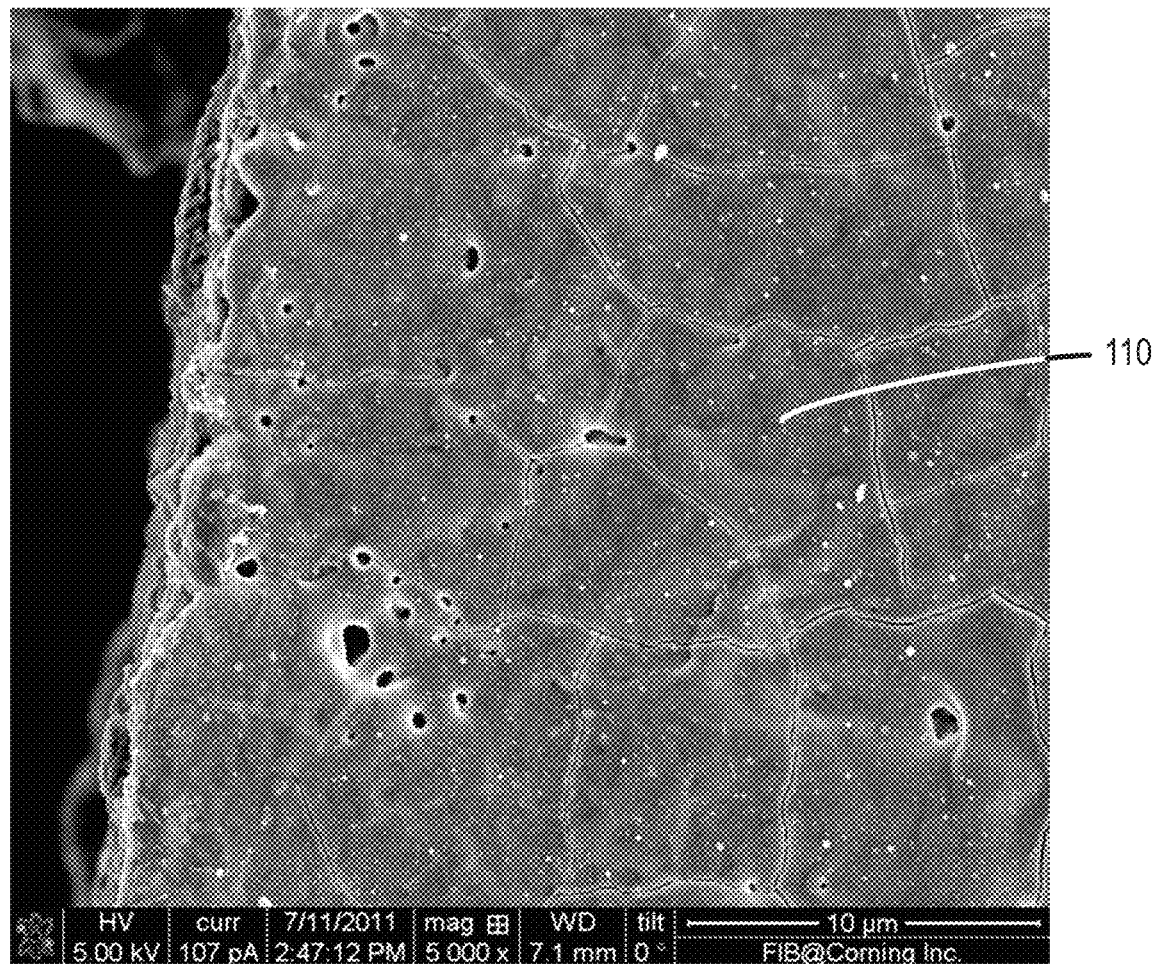
FIG. 1B is a 5000× SEM micrograph of the ablative edge of a lithium ion electrolyte membrane, as seen in FIG. 1A.

As can be seen in the SEM (scanning electron microscopy) micrograph of FIG. 1A, an exemplary LATP electrolyte membrane 100 having an ablative edge 110 demonstrates the appearance of a smooth, glassy surface. FIG. 1B is a greater magnification of the ablative edge 110 of FIG. 1A, and more clearly shows the desired properties in the ablative edge, such as, for example, the ablative edge has few open pores and is substantially fine-grained, flat, wrinkle-free, and hermetic. During laser cutting, some liquid phase sintering appears to take place, thereby forming a thin, smooth shell, as also seen in FIG. 1B. In FIG. 1A, line 120 denotes the thickness of the ablative edge, as described herein.

Figure 2A:
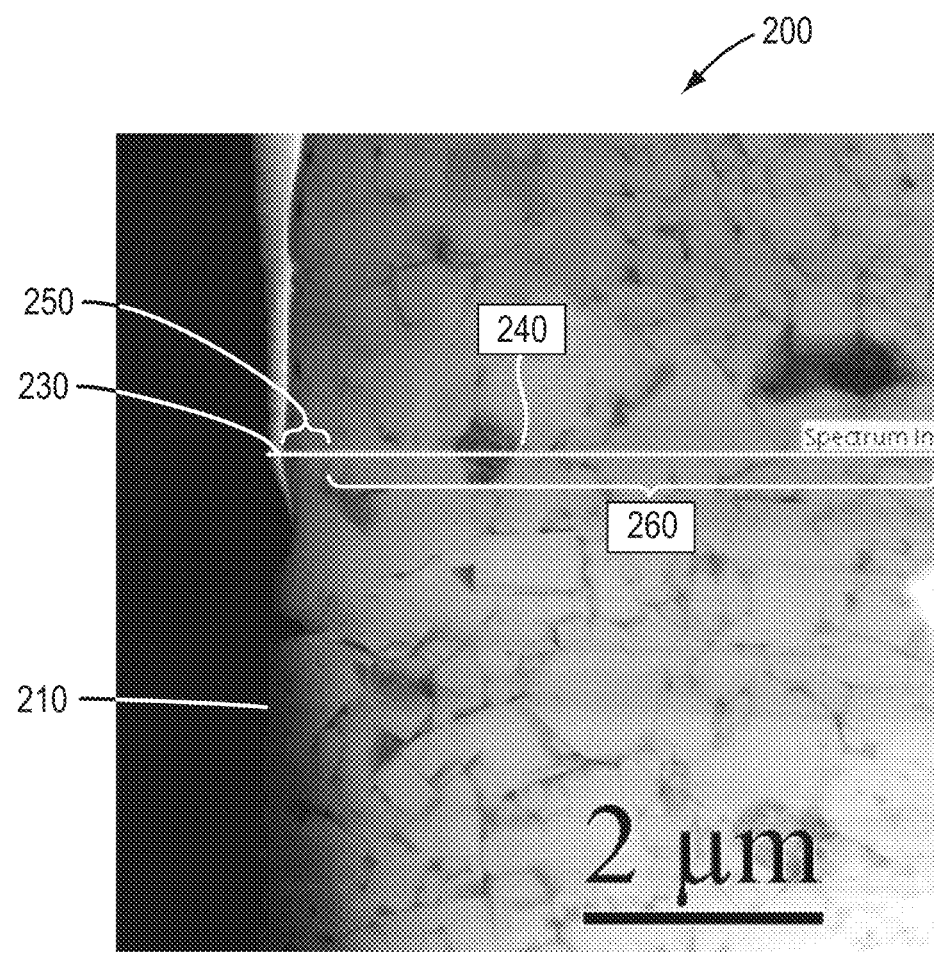
FIG. 2A is an STEM image of an ablative edge of a lithium ion electrolyte membrane, formed according to an embodiment of the disclosure.
Figure 2B:
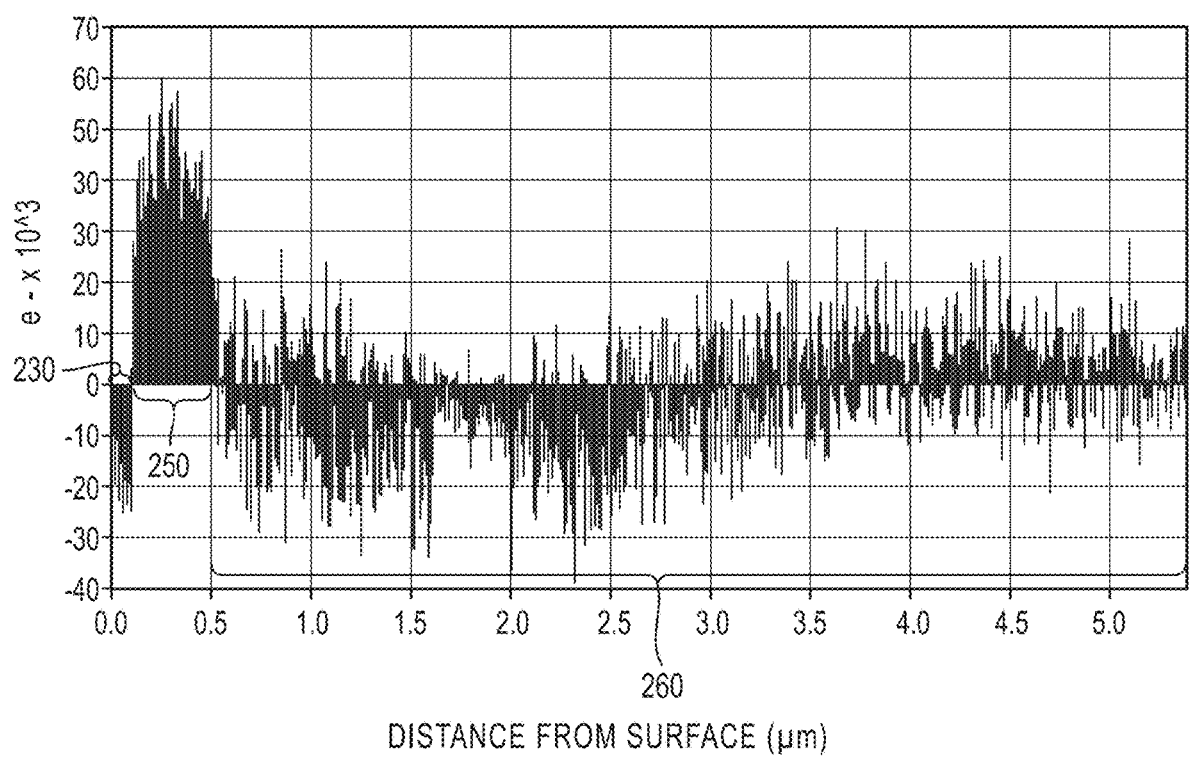
FIG. 2B is an elemental analysis plot of the lithium content of the ablative edge of a lithium ion electrolyte membrane as seen in FIG. 2A.
Figure 2C:
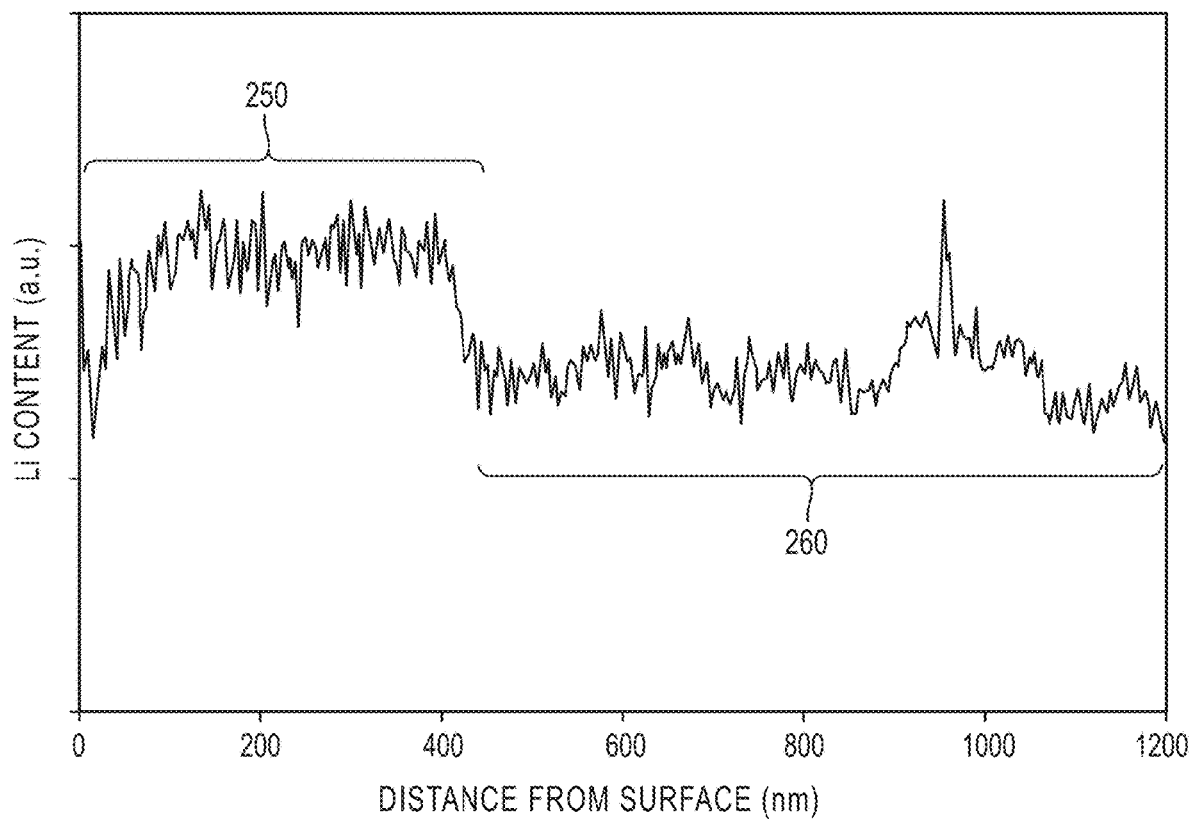
FIG. 2C shows a further elemental analysis plot of the lithium content of the ablative edge of a lithium ion electrolyte membrane as seen in FIG. 2A, measured from 0 to 1200 nm into the surface of the edge.

FIG. 2A shows an STEM (scanning transmission electron microscopy) micrograph of an exemplary LATP electrolyte membrane 200. Line 240 shows a line of measurement of the elemental analysis perpendicular to and through the ablative edge 210, penetrating into the depth of the membrane 200, over a range of slightly more than 5.0 μm. The first approximately 0.1 μm of line 240 is shown penetrating a platinum layer 230 adjacent the ablative edge 210 (added to protect the surface during focused ion beam sample preparation). FIGS. 2B and 2C show the elemental analysis along line 240. As can be seen from FIGS. 2B and 2C, the region 250 of the membrane 200 at or near the ablative edge 210 shows an increased amount of lithium, relative to the remainder (bulk) 260 of the membrane 200 that is further from the ablative edge 210. FIG. 2C demonstrates that the region 250 of the membrane 200 at or near the ablative edge 210 is enriched with approximately 18% more lithium relative to the amount of lithium present in the remainder 260 of the membrane 200. Without wishing to be bound by theory, it is believed that the enrichment of lithium at or near the ablative edge influences the microstructure of the formed edge. For example, lithium may be expected to promote the liquid phase formation.

Figure 3:
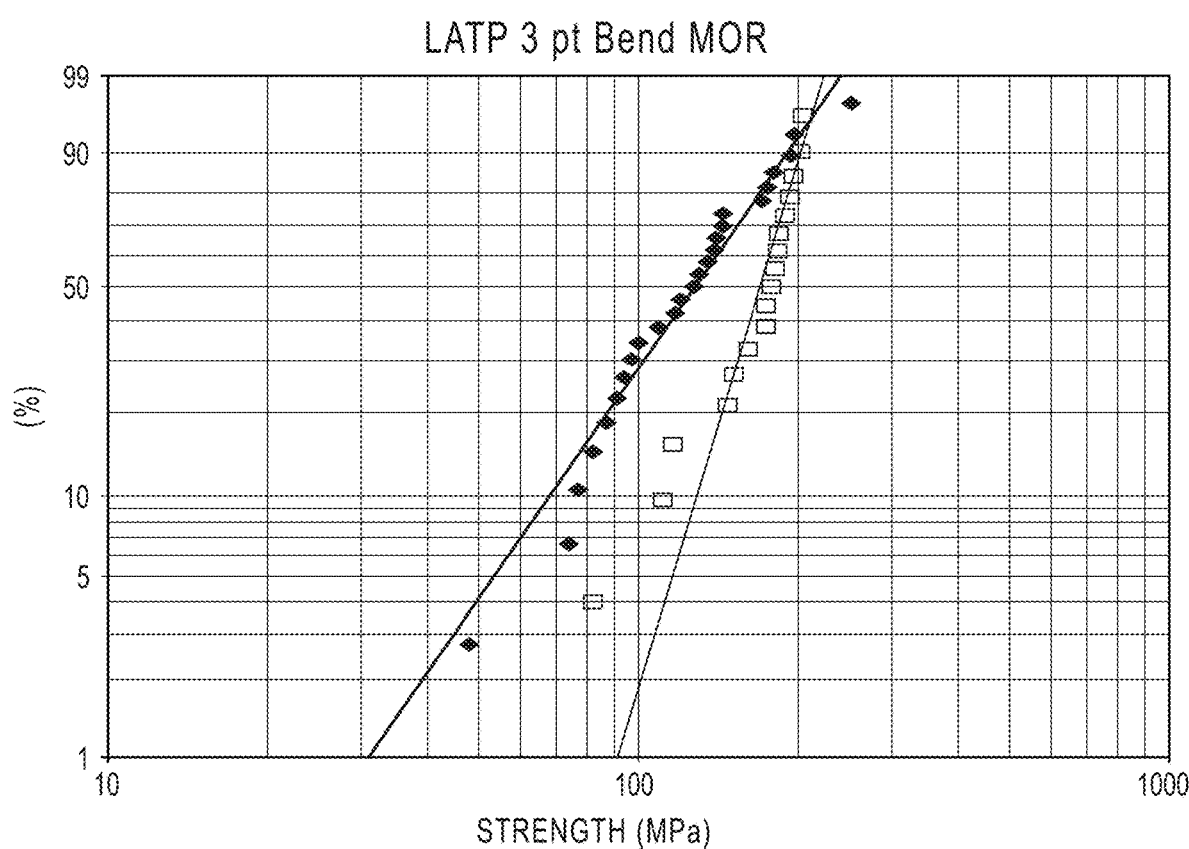
FIG. 3 shows a graphical depiction of the failure probability of an LATP membrane made according to an embodiment of the invention, and an LATP membrane made according to traditional shrink-to-fit methods.

FIG. 3 demonstrates via a 3-point bend test that a membrane according to an exemplary embodiment of the disclosure exhibits greater strength than one made according to a traditional, shrink-to-fit method. In FIG. 3, the filled diamonds correspond to a comparative shrink-to-fit sample, and the open rectangles correspond to an inventive membrane.

As used herein, the phrase "substantially mechanically strong," and variations thereof, means that the electrolyte membrane has a 2-point strength greater than that of the uncut electrolyte sheet, such as, for example, greater than about 50 MPa.

As used herein, the phrase "substantially dense," and variations thereof, means having a relative density of at least about 90%, such as about 95%.

As used herein, the phrase "substantially hermetic," and variations thereof, means that within the sealed region of the electrolyte membrane, there is substantially no interconnected porosity, such that a liquid would not be able to migrate in that region.

As used herein, the phrase "substantially flat," and variations thereof, means there are no height variations greater than 1 mm from a baseline in a perimeter trace of the membrane along a circumferential edge.

As used herein, the phrase "substantially wrinkle free," and variations thereof, means that a trace at the edge of the electrolyte membrane is substantially flat within about 1 mm of the edge.

As used herein, the phrase "substantially pore free," and variations thereof, means that the electrolyte membrane is substantially free of open pores.

As used herein, the phrase "substantially thin," and variations thereof, means that the electrolyte membrane is less than 200 µm thick, such as less than about 100 µm thick.

As used herein, the phrase "substantially fine grained," and variations thereof, means that the grain size within the electrolyte membrane is less than about 5 µm, such as less than about 2 µm.

As used herein, the phrase "substantially precise dimensions," and variations thereof, means that the electrolyte membrane is formed to within about 98% or the target dimensions.

As used herein, the phrase "substantially defect-free edge," and variations thereof, means, in at least one embodiment, edges having microstructural features introduced from the cutting process that are no greater than about ⅓ the thickness of the membrane, such as, for example, no greater than ⅒ the thickness of the membrane.

As used herein, the phrase "ablative edge," and variations thereof, means an edge that has been formed by ablative laser.

Unless otherwise indicated, all numbers used in the specification and claims are to be understood as being modified in all instances by the term "about," whether or not so stated. It should also be understood that the precise numerical values used in the specification and claims form additional embodiments of the invention, and are intended to include any ranges which can be narrowed to any two end points disclosed within the exemplary values provided. Efforts have been made to ensure the accuracy of the numerical values disclosed herein. Any measured numerical value, however, can inherently contain certain errors resulting from the standard deviation found in its respective measuring technique.

EXAMPLE

The following Example is intended to be non-restrictive and explanatory only, with the scope of the invention being defined by the claims.

Fabrication of Tape-Cast LATP Electrolyte Sheet

Starting materials comprising lithium carbonate, aluminum hydroxide, titanium oxide, and ammonium dihydrogen phosphate were mixed in an appropriate ratio to produce $Li_{1.4}Al_{0.4}Ti_{1.6}(PO_4)_3$. The mixed materials were then calcined at 700° C. in a platinum crucible. The mixed phase product was then broken up and jet milled until the particle size was less than about 10 µm, and then subjected to a second calcination at 700° C. The process was found to produce nearly pure LATP with the NASICON-type structure. The product was again broken up, crushed to a coarse powder, and wet attrition-milled in ethanol, to produce a product having an average particle size of about 0.3 µm. To prepare the slip, polyvinyl butyral binder, dibutyl phthalate plasticizer, and PS-236 dispersant were added at levels appropriate for producing a slip which produces a high quality casting. Next, phosphoric acid in an amount of approximately 2 wt % $P_2O_5$ of the inorganic solids content was added and further mixed.

The tape was then air dried, released, and cut. Finally, the tape was sintered at 900° C. for 2 hours. The resulting electrolyte sheet was found to have a relative density over 95%, determined by buoyancy, and an average grain size greater than 10 µm, determined by SEM image analysis.

Laser Cutting

The oversized electrolyte sheet was then placed on a support and cut to the desired finished dimensions with an ablative laser, a frequency-tripled Nd:$YVO_4$ laser. The laser had a wavelength of 355 nm, a repetition rate of 50 kHz, a cutting speed of 230 mm/sec, and a fluence of 190 J/cm².

It is noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed:

1. A ceramic lithium-ion electrolyte membrane comprising
    at least one ablative edge, wherein the at least one ablative edge is an outer edge;
    grains having an average grain size of less than about 5 µm;
    a relative density greater than about 90%; and
    a thickness of up to about 200 µm; and
    wherein the membrane has a 2-point strength greater than about 50MPa.

2. The ceramic lithium-ion electrolyte membrane of claim 1, wherein the at least one ablative edge is enriched with lithium, relative to a bulk of the membrane.

3. The ceramic lithium-ion electrolyte membrane of claim 1, wherein the ablative edge has an amorphous surface.

4. The ceramic lithium-ion electrolyte membrane of claim 1, wherein the thickness is less than about 100 µm.

5. The ceramic lithium-ion electrolyte membrane of claim 4, wherein the thickness is at least about 40 µm.

6. The ceramic lithium-ion electrolyte membrane of claim 1, wherein within the electrolyte membrane there is substantially no interconnected porosity such that the electrolyte membrane is hermetic.

7. The ceramic lithium-ion electrolyte membrane of claim 1, wherein the membrane is unsupported mechanically, not integrated into a multi-layer structure.

8. A ceramic lithium-ion electrolyte membrane comprising
at least one ablative edge, wherein the at least one ablative edge is an outer edge;
grains having an average grain size of less than about 5 µm;
a relative density greater than about 90%; and
a thickness of up to about 200 µm, and
wherein the outer edge has no height variations greater than 1 mm from baseline in a perimeter trace.

9. The ceramic lithium-ion electrolyte membrane of claim 8, wherein the at least one ablative edge is enriched with lithium, relative to a bulk of the membrane.

10. The ceramic lithium-ion electrolyte membrane of claim 8, wherein the ablative edge has an amorphous surface.

11. The ceramic lithium-ion electrolyte membrane of claim 8, wherein the thickness is less than about 100 µm.

12. The ceramic lithium-ion electrolyte membrane of claim 11, wherein the thickness is at least about 40 µm.

13. The ceramic lithium-ion electrolyte membrane of claim 8, wherein within the electrolyte membrane there is substantially no interconnected porosity such that the electrolyte membrane is hermetic.

14. The ceramic lithium-ion electrolyte membrane of claim 8, wherein the membrane is unsupported mechanically, not integrated into a multi-layer structure.

15. A ceramic lithium-ion electrolyte membrane comprising
at least one ablative edge, wherein the at least one ablative edge is an outer edge;
grains having an average grain size of less than about 5 µm;
a relative density greater than about 90%; and
a thickness of up to about 200 µm; and
wherein microstructural features of the ablative edge introduced from cutting are no greater than about ⅓ the thickness of the membrane.

16. The ceramic lithium-ion electrolyte membrane of claim 15, wherein the at least one ablative edge is enriched with lithium, relative to a bulk of the membrane.

17. The ceramic lithium-ion electrolyte membrane of claim 15, wherein the ablative edge has an amorphous surface.

18. The ceramic lithium-ion electrolyte membrane of claim 15, wherein the thickness is less than about 100 µm.

19. The ceramic lithium-ion electrolyte membrane of claim 18, wherein the thickness is at least about 40 µm.

20. The ceramic lithium-ion electrolyte membrane of claim 15, wherein within the electrolyte membrane there is substantially no interconnected porosity such that the electrolyte membrane is hermetic.

21. The ceramic lithium-ion electrolyte membrane of claim 15, wherein the membrane is unsupported mechanically, not integrated into a multi-layer structure.

* * * * *